United States Patent
Kaneiwa et al.

(10) Patent No.: US 9,851,124 B2
(45) Date of Patent: Dec. 26, 2017

(54) ROOM HEATER

(71) Applicant: Rinnai Corporation, Nagoya-shi, Aichi (JP)

(72) Inventors: Satoshi Kaneiwa, Nagoya (JP); Shihori Nishiyama, Nagoya (JP)

(73) Assignee: RINNAI CORPORATION, Nagoya-Shi (JP)

( * ) Notice: Subject to any disclaimer, the term of this patent is extended or adjusted under 35 U.S.C. 154(b) by 484 days.

(21) Appl. No.: 14/543,041

(22) Filed: Nov. 17, 2014

(65) Prior Publication Data

US 2015/0136863 A1    May 21, 2015

(30) Foreign Application Priority Data

Nov. 18, 2013    (JP) .................................. 2013-237566

(51) Int. Cl.
| | |
|---|---|
| F24D 19/10 | (2006.01) |
| F24H 9/20 | (2006.01) |
| G05D 23/19 | (2006.01) |
| F24F 11/00 | (2006.01) |
| F24H 3/06 | (2006.01) |

(52) U.S. Cl.
CPC .......... *F24H 9/2085* (2013.01); *F24F 11/006* (2013.01); *F24H 3/065* (2013.01); *G05D 23/19* (2013.01)

(58) Field of Classification Search
CPC ....................... G05D 23/1931; G05D 23/1928
See application file for complete search history.

(56) References Cited

U.S. PATENT DOCUMENTS

| | | | | |
|---|---|---|---|---|
| 6,089,221 A | * | 7/2000 | Mano | .................... F24H 9/0036 |
| | | | | 126/110 B |
| 6,234,164 B1 | * | 5/2001 | Yasui | ...................... F23N 5/184 |
| | | | | 126/110 R |
| 6,308,702 B1 | * | 10/2001 | Huyghe | .................. F24H 3/105 |
| | | | | 126/110 B |

(Continued)

FOREIGN PATENT DOCUMENTS

JP    2009-150591 A    7/2009

*Primary Examiner* — Avinash Savani
*Assistant Examiner* — Deepak Deean
(74) *Attorney, Agent, or Firm* — Westerman, Hattori, Daniels & Adrian, LLP

(57) ABSTRACT

A room heater is operated on receiving an on-command from a thermostat when a detected temperature detected by a second room-temperature detector falls below a first reference temperature, and is stopped on receiving an off-command when the temperature detected by the second room-temperature detector is above a second reference temperature that is set higher than the first reference temperature or when the thermostat is manually operated to be switched off. A setting temperature for temperature control to be carried out when the on-command is received again is updated according to a difference between the set temperature and the temperature detected by the first room-temperature detector on receiving the off-command. When the off-command is received before passing a predetermined period of time after receiving the on-command, the updating of the set temperature is prohibited if the temperature detected by the first room-temperature detector is below a predetermined minimum lower reference temperature.

4 Claims, 2 Drawing Sheets

(56) References Cited

U.S. PATENT DOCUMENTS

| | | | | |
|---|---|---|---|---|
| 6,766,962 B2* | 7/2004 | Paul | ................... | G05D 23/1951 |
| | | | | 165/269 |
| 8,074,636 B2* | 12/2011 | Nishio | .................. | F24H 3/0488 |
| | | | | 126/112 |
| 8,474,729 B2* | 7/2013 | Kaneiwa | ............... | F24B 1/1808 |
| | | | | 126/504 |
| 8,682,492 B2* | 3/2014 | Koyanagi | .............. | F24F 11/006 |
| | | | | 236/1 C |
| 8,902,071 B2* | 12/2014 | Barton | ................. | F24F 12/001 |
| | | | | 219/667 |
| 2014/0312130 A1* | 10/2014 | Kawai | ................... | F24F 11/006 |
| | | | | 236/51 |

* cited by examiner

ROOM HEATER

BACKGROUND

Technical Field

The present invention relates to a room heater including a room-temperature detecting means (a detector which detects a room temperature) and a control means (a controller) configured to control temperature by adjusting an amount of heat to be provided to room air according to a difference between a detected temperature detected by the room-temperature detecting means and a predetermined set temperature.

Related Art

As this kind of room heater, JP 2009-150591A discloses a room heater in which a control means is coupled to a thermostat that is also coupled to other appliances. The thermostat includes a second room-temperature detecting means provided independent of a first room-temperature detecting means of the room heater. The thermostat is configured to output an on-command when a detected temperature detected by the second room-temperature detecting means becomes a predetermined first reference temperature or below, and to output an off-command when the detected temperature detected by the second room-temperature detecting means becomes such a predetermined second reference temperature or above, or when the thermostat is manually operated to be switched off, the second reference temperature being set higher than the first reference temperature. On receiving an on-command from the thermostat, the control means operates the room heater, and on receiving an off-command from the thermostat, the control means stops the room heater. The room heater disclosed in JP 2009-150591A is further configured to update a set temperature of temperature control when an on-command from the thermostat is received again according to a difference between a detected temperature detected by the first room-temperature detecting means of the room heater on receiving the off-command from the thermostat and the set temperature.

The control means of the room heater can only receive the on-command and the off-command from the thermostat and cannot recognize the first reference temperature and the second reference temperature set in the thermostat. Therefore, in order to prevent the temperature control from being carried out by the set temperature that has already been set without relation to a room temperature even if the temperature of the room air has already been elevated, e.g., to the second reference temperature when the off-command was outputted from the thermostat, the above-described known room heater is arranged to update the set temperature.

There are cases where, when not much time has passed since the receiving of the on-command and therefore the room temperature has not been elevated much, the thermostat is manually operated to be switched off so that the control means of the room heater receives the off-command. In this case, the first room-temperature detecting means detects a temperature lower than the set temperature. Therefore, in the above-described known room heater, the set temperature will be updated to a lower temperature. Further, since it is impossible on the side of the room heater to recognize the first reference temperature and the second reference temperature. When the on-command is received again, the temperature control is carried out at the low temperature, whereby the user is made to feel uncomfortable.

SUMMARY

In view of the abovementioned problem, an object of the present invention is to provide a room heater which can control temperature without making a user uncomfortable.

In order to solve the abovementioned problem, there is provided a room heater comprising: a first room-temperature detecting means; and a control means configured to control temperature by adjusting an amount of heat to be provided to room air according to a difference between a detected temperature detected by the first room-temperature detecting means and a predetermined set temperature. A thermostat including a second room-temperature detecting means provided separately from the first room-temperature detecting means of the room heater is coupled to the control means. The thermostat is configured: to output an on-command when a detected temperature detected by the second room-temperature detecting means becomes a predetermined first reference temperature or below; and to output an off-command when a detected temperature detected by the second room-temperature detecting means becomes a predetermined second reference temperature or above, or when the thermostat is manually operated to be switched off, the second reference temperature being set higher than the first reference temperature. The control means is configured: to operate the room heater on receiving an on-command from the thermostat; to stop the room heater on receiving an off-command from the thermostat; and to update a set temperature according to a difference between a detected temperature detected by the first room-temperature detecting means of the room heater on receiving the off-command from the thermostat, and the set temperature. The updated set temperature is used for controlling temperature when an on-command is received again. When the off-command is received before passing a predetermined period of time after receiving the on-command, the updating of the set temperature is prohibited if the detected temperature detected by the first room-temperature detecting means of the room heater is a predetermined minimum lower reference temperature or below.

According to this invention, even if the thermostat is manually operated to be switched off after having received the on-command from the thermostat before passing the predetermined period of time so that the control means of the room heater receives the off-command, the set temperature will not be updated if the room air temperature has not exceeded the predetermined minimum lower reference temperature. If the minimum lower reference temperature is set according to a lower limit value of a temperature range in which the user does not feel uncomfortable, the temperature control at such a low temperature as to give the user an uncomfortable feeling can be prevented.

Further, according to this invention, when the off-command is received after passing the predetermined period of time after receiving the on-command, the updating of the set temperature is prohibited if an absolute value of a difference between the detected temperature detected by the first room-temperature detecting means and the set temperature is a predetermined value or below.

DETAILED DESCRIPTION

Figure 1:
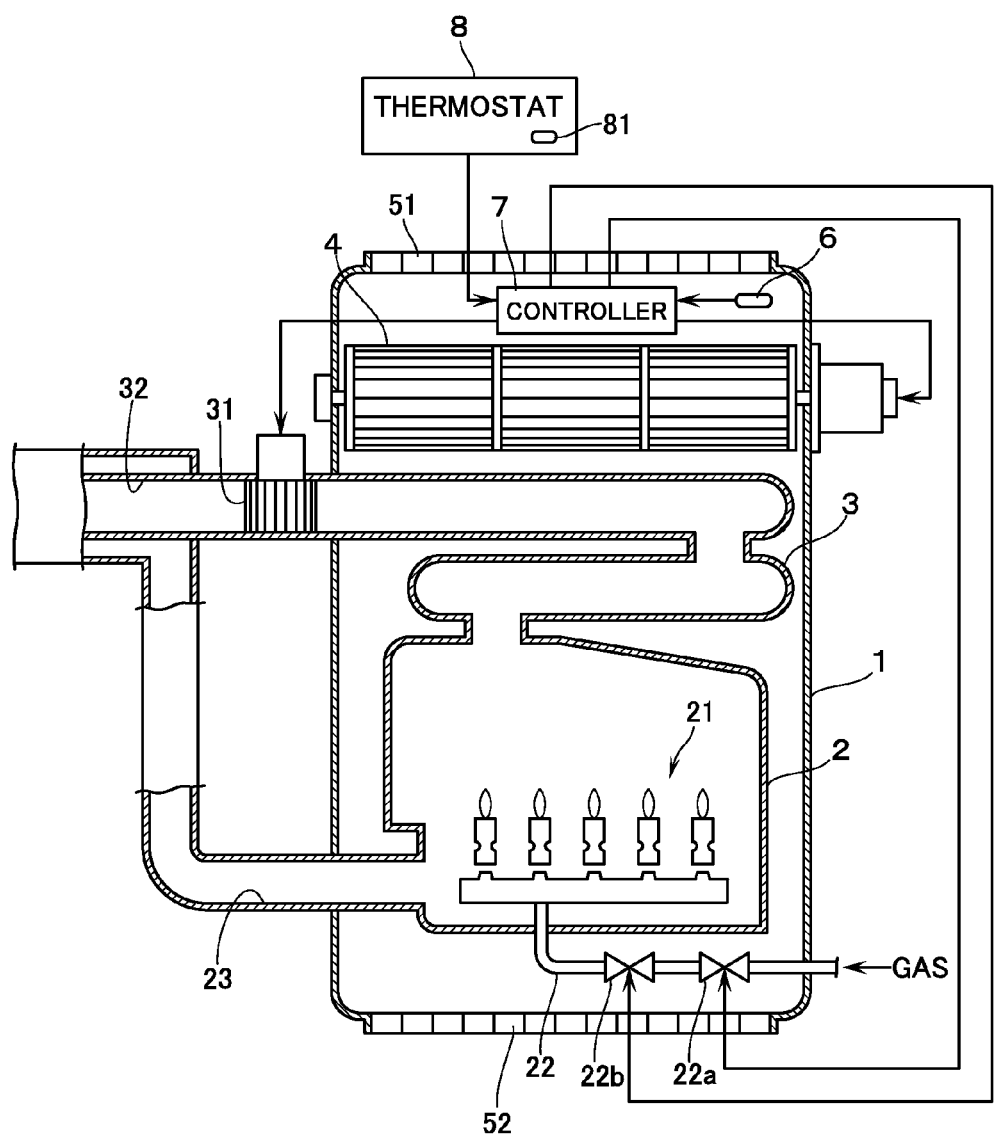
FIG. 1 illustrates a configuration of a room heater according to an embodiment of this invention.

FIG. 1 illustrates a room heater 1 according to an embodiment of this invention. The room heater 1 contains therein: a combustion casing 2 having therein a burner 21; and a heat exchanger 3 in which combustion gas from the burner 21 flows. A supply passage 22 for supplying a fuel gas to the burner 21 has interposed therein: a solenoid valve 22a for opening/closing the supply passage 22; and a proportional valve 22b for varying the flow rate of the fuel gas. In this arrangement, air is supplied from an inlet passage 23 on an upstream of the combustion casing 2, and combustion gas is exhausted to an exhaust passage 32 via an exhaust fan 31 provided on a downstream of the heat exchanger 3. By operating a convection fan 4 provided above the heat exchanger 3, room air sucked from an air inlet 51 opened in a back face of the room heater 1 is heated by exchanging heat with the heat exchanger 3 and is then blown out of the room heater 1 as warm air from an air outlet 52 opened in a lower part of a front face of the room heater 1.

The room heater 1 includes: a first room-temperature detecting means 6 for detecting a temperature of the room air sucked from the air inlet 51; and a controller 7 which is generically called a control means to control temperature by adjusting the proportional valve 22b to adjust an amount of heat to be provided to the room air according to a difference between a detected temperature detected by the first room-temperature detecting means 6 and a predetermined set temperature. The controller 7 has coupled thereto a thermostat 8. The thermostat 8 has a second room-temperature detecting means 81 which is different from the first room-temperature detecting means 6 in the room heater 1 (this room-temperature detecting means 6 is also called "a first room-temperature detecting means" to distinguish it from the second room-temperature detecting means 81). The thermostat 8 outputs an on-command when a detected temperature detected by the second room-temperature detecting means 81 becomes a predetermined first reference temperature or below, and outputs an off-command when the detected temperature detected by the second room-temperature detecting means 81 becomes a predetermined second reference temperature or above, or when the thermostat 8 is manually operated to be switched off. The second reference temperature is set higher than the first reference temperature. On receiving an on-command from the thermostat 8, the controller 7 starts an operation of the room heater 1 by opening the solenoid valve 22a and by operating the exhaust fan 31 and the convection fan 4. On receiving an off-command from the thermostat 8, the controller 7 stops the operation of the room heater 1 by closing the solenoid valve 22a and by stopping the operation of the exhaust fan 31 and the convection fan 4. Further, the thermostat 8 is so arranged that the setting of the first reference temperature and the second reference temperature can be changed.

Figure 2:
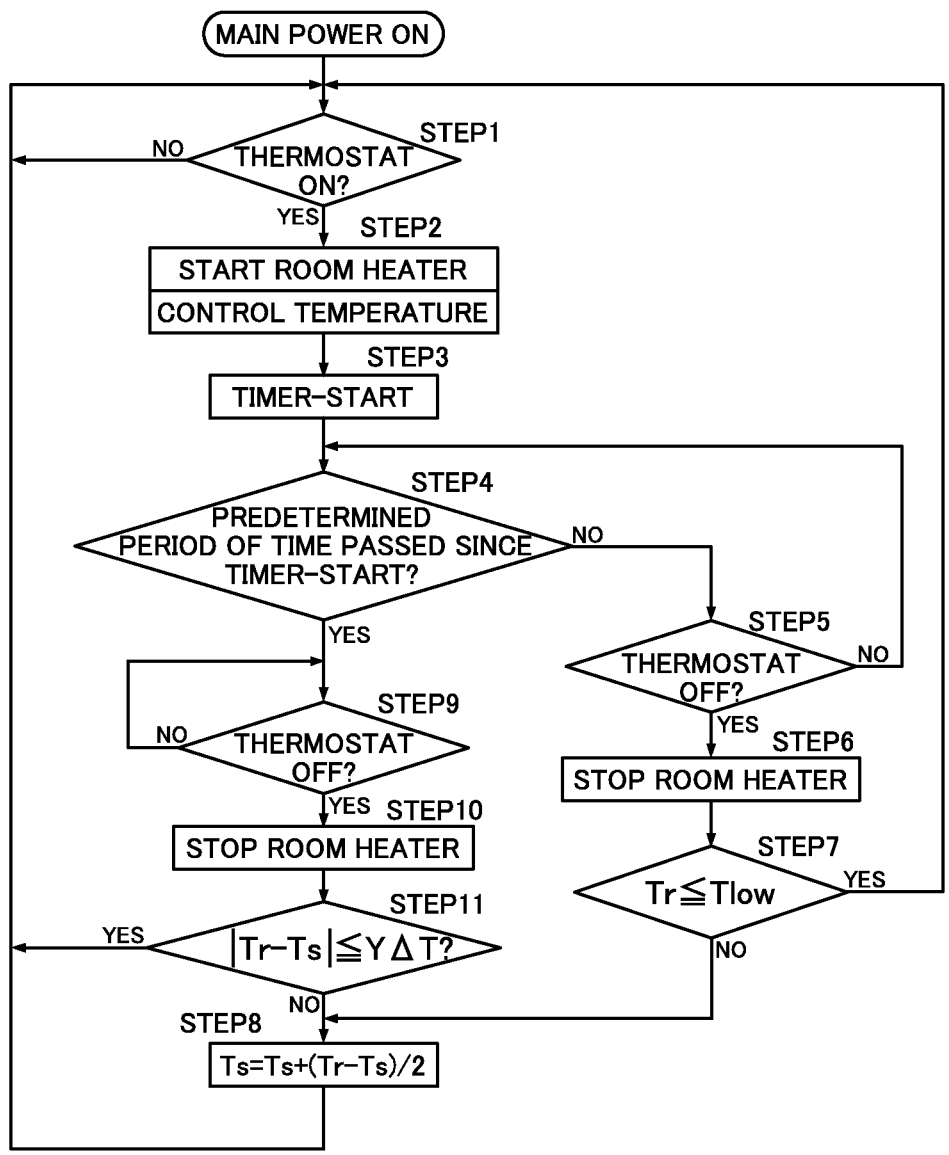
FIG. 2 is a flow diagram illustrating a control flow of the room heater in FIG. 1.

The controller 7 is further configured to update a set temperature according to a difference between a detected temperature detected by the first room-temperature detecting means 6 of the room heater 1 when the off-command from the thermostat 8 is received and the set temperature, where the updated set temperature is used for controlling temperature when an on-command is received again. Note that, when the off-command is received before a predetermined period of time has passed after receiving the on-command, updating of the set temperature is prohibited if the temperature detected by the first room-temperature detecting means 6 of the room heater 1 is as small as, or smaller than, a predetermined minimum lower reference temperature. Further, when the off-command is received after the predetermined period of time has passed after receiving the on-command, updating of the set temperature is prohibited if an absolute value of a difference between the detected temperature detected by the first room-temperature detecting means 6 and the set temperature is as small as, or smaller than, a predetermined value. The updating and prohibition of updating of the set temperature are described below referring to FIG. 2.

First, when, e.g., a user turns on a main power of the room heater 1, determination is made at STEP 1 whether or not the controller 7 has received the on-command from the thermostat 8, that is, whether or not the detected temperature detected by the second room-temperature detecting means 81 of the thermostat 8 has become the predetermined first reference temperature or below. Once the controller 7 has received the on-command from the thermostat 8, the operation of the room heater 1 is started at STEP 2. The control of the temperature by adjusting the amount of heat to be provided to the room air is then carried out according to the difference between the detected temperature Tr detected by the first room-temperature detecting means 6 and the predetermined set temperature Ts. In this manner, when the controller 7 starts operating the room heater 1 on receiving the on-command from the thermostat 8, a timing operation with a timer equipped in the controller 7 is started at STEP 3 (timer-start).

Then, at STEP 4, the controller 7 determines whether or not the predetermined period of time (e.g., 20 minutes) has passed since the timer-start. At STEP 5, until the predetermined period of time passes, the controller 7 determines whether or not the off-command has been received from the thermostat 8, that is, whether or not the detected temperature detected by the second room-temperature detecting means 81 of the thermostat 8 has become the predetermined second reference temperature or above or whether or not the thermostat 8 has been manually operated to be switched off. When the controller 7 receives the off-command from the thermostat 8, the controller 7 stops the room heater 1 at STEP 6. Then at STEP 7, the controller 7 determines whether or not the detected temperature Tr detected by the first room-temperature detecting means 6 of the room heater 1 is at the predetermined minimum lower reference temperature Tlow or below. If Tr>Tlow, the process proceeds to STEP 8 to update the set temperature Ts, which is used for controlling temperature when the on-command is received again, according to the difference between the detected temperature Tr detected by the first room-temperature detecting means 6 of the room heater 1 when the off-command from the thermostat 8 is received and the set temperature Ts. The process then returns to STEP 1. In the embodiment, the set temperature Ts is updated by adding a half of the difference between the detected temperature Tr and the previous set temperature Ts to the previous set temperature Ts. The set temperature Ts can also be updated by adding the difference between the detected temperature Tr and the previous set temperature Ts to the previous set temperature Ts, that is, the set temperature Ts can be updated to the detected temperature Tr detected by the first room-temperature detecting means 6 at the time when the off-command from the thermostat 8 is received.

On the other hand, at STEP 7, if it is judged that Tr≤Tlow, the process proceeds to STEP 1. Therefore, even when the controller 7 receives the off-command, by the thermostat 8 being manually operated to be switched off, before the predetermined period of time passes after receiving the on-command from the thermostat 8, the set temperature Ts is not updated if the room temperature is not exceeding the predetermined minimum lower reference temperature Tlow. By setting the minimum lower reference temperature Tlow to a minimum limit value of the temperature range in which the user does not feel uncomfortable (e.g., 18° C.), the temperature control can be carried out avoiding low temperature which makes the user uncomfortable.

When the controller 7 judges that the predetermined period of time has passed at STEP 4, the process proceeds to STEP 9 to determine whether or not the off-command has been received from the thermostat 8. When the controller 7 receives the off-command from the thermostat 8, the process proceeds to STEP 10 to stop the room heater 1. Then at STEP 11, the controller 7 determines whether or not the absolute value of difference between the detected temperature Tr detected by the first room-temperature detecting means 6 and the set temperature Ts is the predetermined value Y$\Delta$T or below. If |Tr−Ts|>Y$\Delta$T, the process proceeds to STEP 8. On the other hand, if |Tr−Ts|≤Y$\Delta$T, the process returns to STEP 1. By the way, the predetermined value Y$\Delta$T is set, e.g., to 2° C. according to an allowable range of overshoot and undershoot from the set temperature Ts attributable to controlling of the room temperature.

The embodiment of this invention has been described above referring to the drawings. However, this invention is not limited to the embodiment. For example, in the above-described embodiment, the first room-temperature detecting means 6 is configured to detect the temperature of the room temperature sucked from the air inlet 51, though the first room-temperature detecting means may be provided on an outer surface of the room heater 1 and configured to detect the room temperature outside the room heater 1.

What is claimed is:

1. A room heater, comprising:
    a first room-temperature detector; and
    a controller configured to control temperature by adjusting an amount of heat to be provided to room air according to a difference between a detected temperature detected by the first room-temperature detector and a predetermined set temperature,
    wherein a thermostat including a second room-temperature detector provided separately from the first room-temperature detector is coupled to the controller,
    wherein the thermostat is configured to output an on-command when a detected temperature detected by the second room-temperature detector becomes a predetermined first reference temperature or below,
    wherein the thermostat is configured to output an off-command when a detected temperature detected by the second room-temperature detector becomes a predetermined second reference temperature or above, or when the thermostat is manually operated to be switched off, the second reference temperature being set higher than the first reference temperature,
    wherein the controller is configured to operate a heating element of the room heater on receiving an on-command from the thermostat,
    wherein the controller is configured to stop the heating element of the room heater on receiving an off-command from the thermostat,
    wherein the controller is configured to calculate an updated set temperature using a detected temperature detected by the first room-temperature detector on receiving the off-command from the thermostat and the set temperature as variables, the updated set temperature being used for controlling temperature when an on-command is received again,
    wherein the controller is configured to, when the off-command is received before passing a predetermined period of time after receiving the on-command, prohibit the updating of the set temperature if the detected temperature detected by the first room-temperature detector is a predetermined minimum lower reference temperature or below, and
    wherein the controller is configured to, when the off-command is received before passing a predetermined period of time after receiving the on-command, perform the updating of the set temperature if the detected temperature detected by the first room-temperature detector is above the predetermined minimum lower reference temperature.

2. The room heater according to claim 1,
    wherein the controller is configured to, when the off-command is received after passing the predetermined period of time after receiving the on-command, prohibit the updating of the set temperature if an absolute value of a difference between the detected temperature detected by the first room-temperature detector and the set temperature is a predetermined value or below, and
    wherein the controller is configured to, when the off-command is received after passing the predetermined period of time after receiving the on-command, perform the updating of the set temperature if an absolute value of a difference between the detected temperature detected by the first room-temperature detector and the set temperature is above the predetermined value.

3. A room heater system, comprising:
    a room heater comprising
        a first room-temperature detector; and
        a controller configured to control temperature by adjusting an amount of heat to be provided to room air according to a difference between a detected temperature detected by the first room-temperature detector and a predetermined set temperature, and
    a thermostat including a second room-temperature detector provided separately from the first room-temperature detector of the room heater, the thermostat being coupled to the controller,
    wherein the thermostat is configured to output an on-command when a detected temperature detected by the second room-temperature detector becomes a predetermined first reference temperature or below,
    wherein the thermostat is configured to output an off-command when a detected temperature detected by the second room-temperature detector becomes a predetermined second reference temperature or above, or when the thermostat is manually operated to be switched off, the second reference temperature being set higher than the first reference temperature,
    wherein the controller is configured to operate a heating element of the room heater on receiving an on-command from the thermostat,
    wherein the controller is configured to stop the heating element of the room heater on receiving an off-command from the thermostat,
    wherein the controller is configured to calculate an updated set temperature using a detected temperature detected by the first room-temperature detector on receiving the off-command from the thermostat and the set temperature as variables, the updated set temperature being used for controlling temperature when an on-command is received again, wherein the controller is configured to, when the off-command is received before passing a predetermined period of time after receiving the on-command, prohibit the updating of the set temperature if the detected temperature detected by the first room-temperature detector is a predetermined minimum lower reference temperature or below, and wherein the controller is configured to, when the off-command is received before passing a predetermined period of time after receiving the on-command, perform the updating of the set temperature if the detected temperature detected by the first room-temperature detector is above the predetermined minimum lower reference temperature.

4. The room heater system according to claim 3, wherein the controller is configured to, when the off-command is received after passing the predetermined period of time after receiving the on-command, prohibit the updating of the set temperature if an absolute value of a difference between the detected temperature detected by the first room-temperature detector and the set temperature is a predetermined value or below, and wherein the controller is configured to, when the off-command is received after passing the predetermined period of time after receiving the on-command, perform the updating of the set temperature if an absolute value of a difference between the detected temperature detected by the first room-temperature detector and the set temperature is above the predetermined value.

* * * * *